United States Patent
Tsuda et al.

(10) Patent No.: US 8,643,505 B2
(45) Date of Patent: Feb. 4, 2014

(54) HOST VEHICLE WITH EXTERNALLY PERCEIVABLE CRUISE CONTROL INDICATING DEVICE

(75) Inventors: Hiroshi Tsuda, McLean, VA (US); Ronald Heft, Stafford, VA (US)

(73) Assignee: Nissan North America, Inc., Franklin, TN (US)

( * ) Notice: Subject to any disclaimer, the term of this patent is extended or adjusted under 35 U.S.C. 154(b) by 244 days.

(21) Appl. No.: 13/150,837

(22) Filed: Jun. 1, 2011

(65) Prior Publication Data
US 2012/0306634 A1 Dec. 6, 2012

(51) Int. Cl.
*G08G 1/16* (2006.01)

(52) U.S. Cl.
USPC ............ 340/903; 340/435; 340/463; 701/70; 701/96

(58) Field of Classification Search
USPC ............ 340/903, 425.5, 435–436, 438, 441, 340/463, 466–467; 701/70, 78–79, 93–98, 701/300
See application file for complete search history.

(56) References Cited

U.S. PATENT DOCUMENTS

| | | | | |
|---|---|---|---|---|
| 5,486,808 A | * | 1/1996 | Nejdl | 340/464 |
| 5,926,117 A | * | 7/1999 | Gunji et al. | 340/988 |
| 6,044,321 A | * | 3/2000 | Nakamura et al. | 701/96 |
| 6,313,758 B1 | * | 11/2001 | Kobayashi | 340/932 |
| 6,330,507 B1 | | 12/2001 | Adachi et al. | |
| 6,335,681 B1 | * | 1/2002 | Ontiveros et al. | 340/466 |
| 6,397,149 B1 | | 5/2002 | Hashimoto | |
| 2002/0152015 A1 | * | 10/2002 | Seto | 701/96 |
| 2002/0198660 A1 | * | 12/2002 | Lutter et al. | 701/301 |
| 2003/0135318 A1 | * | 7/2003 | Tellis et al. | 701/96 |
| 2003/0234127 A1 | * | 12/2003 | Sudou et al. | 180/170 |
| 2004/0024529 A1 | * | 2/2004 | Ibrahim | 701/301 |
| 2006/0191730 A1 | * | 8/2006 | Alden et al. | 180/272 |
| 2007/0083318 A1 | * | 4/2007 | Parikh | 701/96 |
| 2008/0082261 A1 | * | 4/2008 | Tengler et al. | 701/210 |
| 2008/0243337 A1 | * | 10/2008 | Tsuda | 701/41 |
| 2009/0096598 A1 | * | 4/2009 | Tengler et al. | 340/453 |
| 2010/0045481 A1 | * | 2/2010 | Tengler et al. | 340/902 |
| 2010/0188265 A1 | | 7/2010 | Hill et al. | |
| 2010/0198478 A1 | * | 8/2010 | Shin | 701/96 |
| 2010/0256836 A1 | | 10/2010 | Mudalige | |

OTHER PUBLICATIONS

Mixon Hill, Clarus Weather System Design, High Level System Requirements Specification, Jun. 13, 2005.
Christopher Nowakowski et al., Cooperative Adaptive Cruise Control: Testing Drivers' Choices of Following Distances, Nov. 2010.

* cited by examiner

*Primary Examiner* — Hai Phan
*Assistant Examiner* — Orlando Bousono
(74) *Attorney, Agent, or Firm* — Global IP Counselors, LLP

(57) ABSTRACT

A host vehicle includes a cruise control system and an externally perceivable indicating device. The cruise control system is configured to selectively synchronize speed control of the host vehicle with at least one other vehicle. The cruise control system includes a relative position detecting device configured to determine position of the at least one second vehicle relative to the host vehicle, a vehicle speed control device, and a vehicle-to-vehicle communication device. The externally perceivable indicating device is configured to provide an indication of the operating status of the cruise control system.

20 Claims, 13 Drawing Sheets

US 8,643,505 B2

HOST VEHICLE WITH EXTERNALLY PERCEIVABLE CRUISE CONTROL INDICATING DEVICE

BACKGROUND

1. Field of the Invention

The present invention generally relates to a host vehicle that includes a cruise control with an externally perceivable indicator. More specifically, the present invention relates to a vehicle having an externally perceivable indicator that is visible from other vehicles that indicates the operating status of the cruise control of the host vehicle.

2. Background Information

Many vehicles are being equipped with cruise control systems such as adaptive cruise control systems (ACC). A first vehicle that includes an ACC system is able to follow behind a second vehicle forming a caravan, with the ACC system controlling the speed of the first vehicle, such that speed variations of the second vehicle are adjusted for by the ACC system of the first vehicle.

Similarly, vehicles that include a conceived cruise control system referred to as a cooperative adaptive cruise control systems (CACC systems) can communicate with one another such that two vehicles are able to negotiate a communications link therebetween. Once the communications link is established, the two vehicles and their respective drivers can decide whether or not conditions are met that allow the two vehicles to travel together on a highway in a procession or caravan. If the drivers and the CACC systems decide to synchronize their respective speed control operations, the CACC systems of the two vehicles further communicate with one another synchronizing their speed control operations such that one vehicle becomes a leading or frontward vehicle and the other vehicle becomes a trailing or following vehicle, with the trailing vehicle synchronizing its speed changes with speed changes of the frontward vehicle while maintaining a safe distance from the frontward vehicle.

In other words, the ACC system allows for a following vehicle to adjust its speed based on speed changes in the frontward vehicle and the CACC systems of two linked vehicles causes speed changes of the frontward vehicle to be copied by the trailing or following vehicle.

SUMMARY

It is an object of the present invention to provide a host vehicle that includes a cruise control system with an indicating device that can indicate the operating status of the cruise control system, where the indicating device is discernible from a second vehicle, so that the driver of the second vehicle can recognize the operating status of the cruise control system of the host vehicle.

In view of the state of the known technology, one aspect of the invention is a host vehicle that includes a cruise control system and an externally perceivable indicating device. The cruise control system is configured to selectively synchronize speed control of the host vehicle with at least one other vehicle. The cruise control system includes a relative position detecting device configured to determine position of the at least one second vehicle relative to the host vehicle and a vehicle speed control device. The externally perceivable indicating device is configured to provide an indication of the operating status of the cruise control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
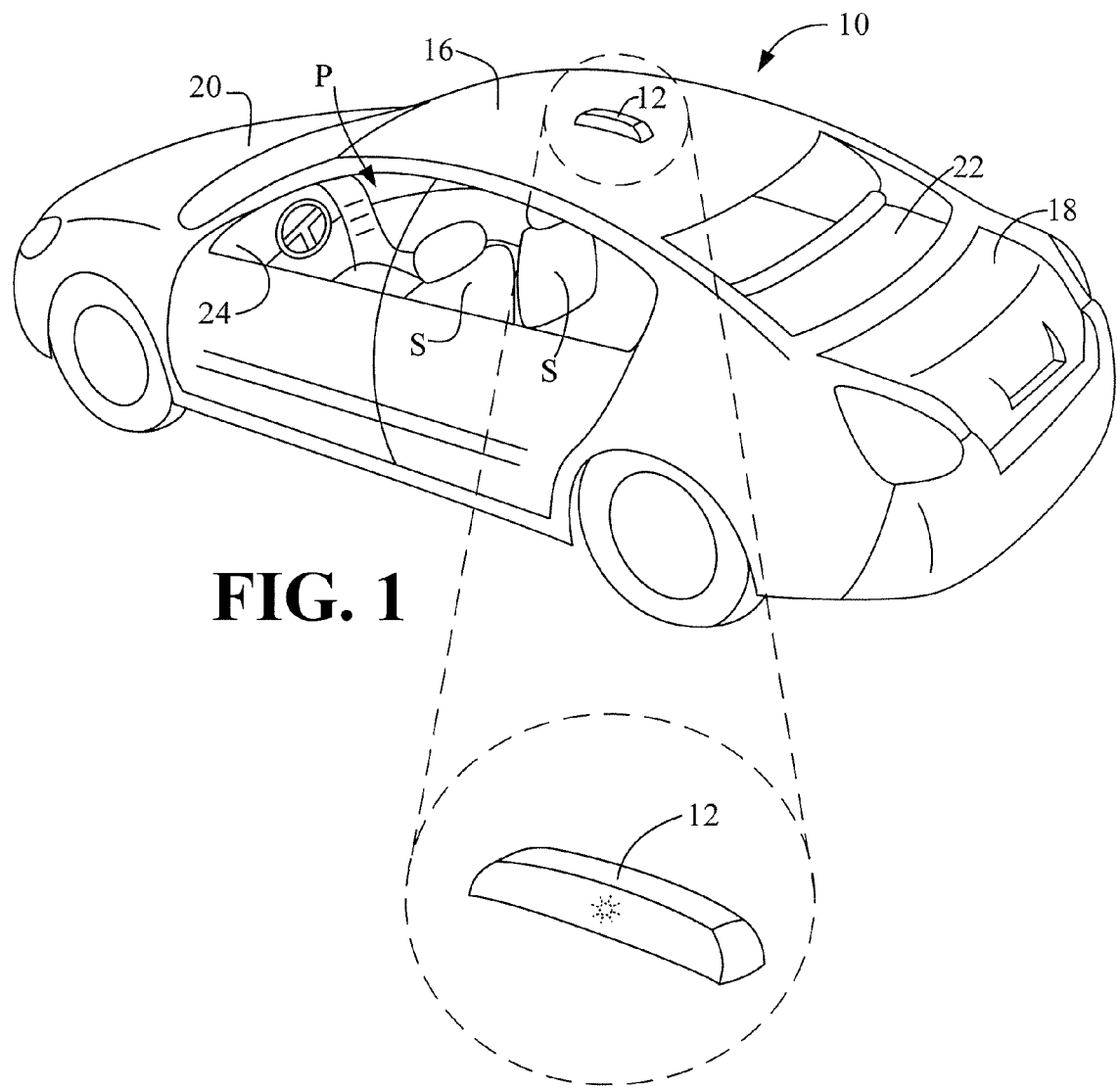
FIG. 1 is a perspective view of a host vehicle that includes a cooperative adaptive cruise control system (CACC) and an externally perceivable indicating device in accordance with a first embodiment.

Referring initially to FIG. 1, a host vehicle 10 is illustrated in accordance with a first embodiment. The host vehicle 10 includes an indicating device 12 controlled by a cooperative adaptive cruise control system 14 (CACC system 14) that is described in greater detail below with respect to FIGS. 2 and 3. The indicating device 12 is an externally perceivable indicating device that is visible or discernible by drivers of other vehicles so that the drivers of the other vehicles can recognize the operating status of the CACC system 14 in the host vehicle 10, as is described in greater detail below.

As shown in FIG. 1, the host vehicle 10 includes conventional components such as an engine and transmission (not shown), a body structure that includes, among other things, a vehicle roof 16, a trunk lid 18, a front hood 20 and a passenger compartment P. Within the passenger compartment P, there are also many conventional features, such as a rear window shelf 22, a dashboard 24 and seats S.

In the first embodiment depicted in FIG. 1, the indicating device 12 is installed on the vehicle roof 16. However, it should be understood from the drawings and description hereinbelow, that the indicating device 12 can be installed to the host vehicle 10 at any of a variety of different locations. For example, the indicating device 12 can be installed on any of a variety of exterior surfaces of the host vehicle 10 such as the trunk lid 18 and/or the front hood 20 of the host vehicle 10. Still further, the indicating device 12 can be located within the passenger compartment P of the host vehicle 10, for example, on the rear window shelf 22 and/or the dashboard 24. Still further, as shown in a later embodiment, the indicating device 12 can be located on a lower surface of the vehicle roof 16 within the passenger compartment P of the host vehicle 10, as described below with respect to a fourth embodiment. However, the externally perceivable indicating device 12 is fixed to an external surface of the host vehicle 10 in the first embodiment.

Figure 2:
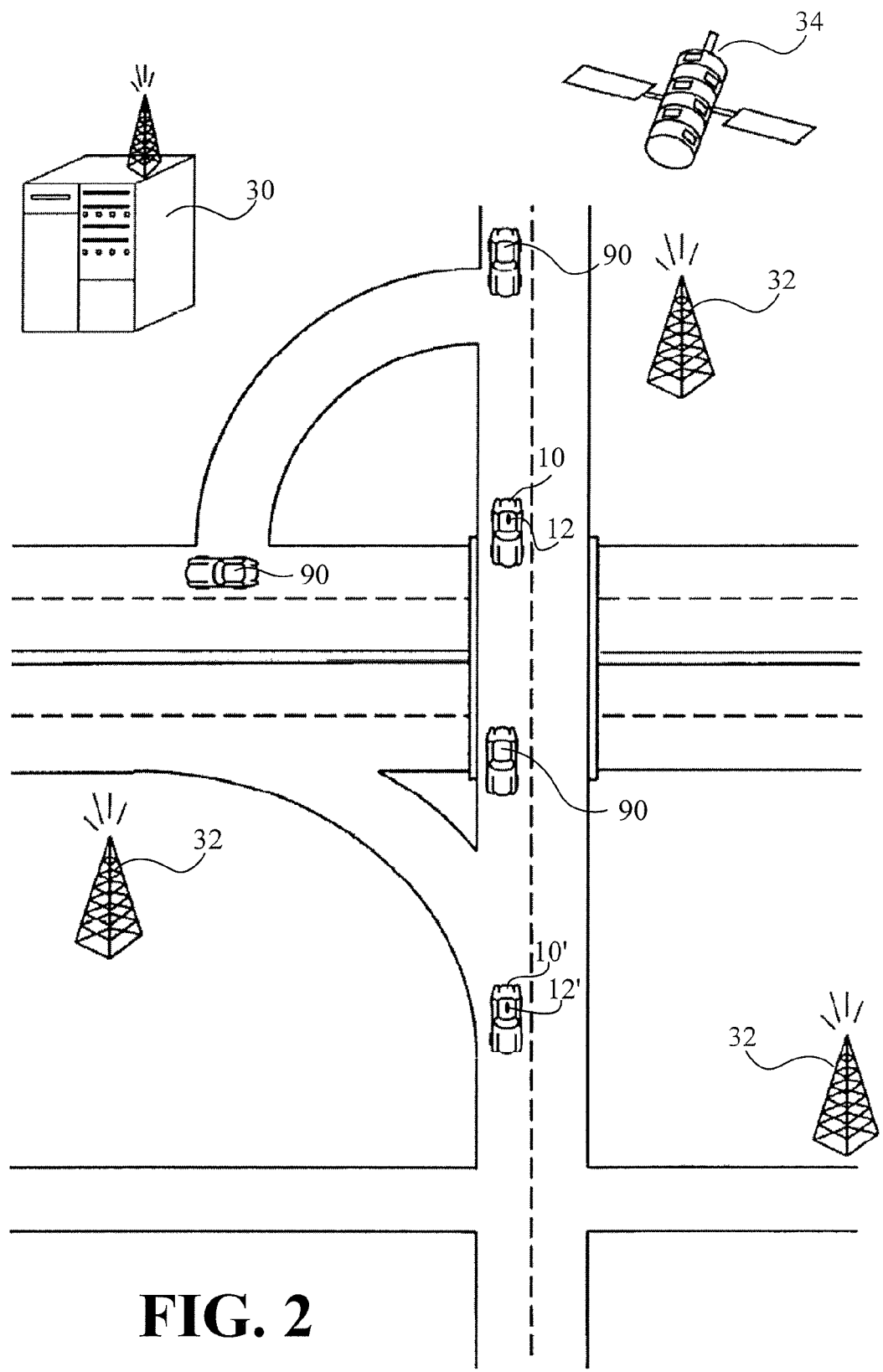
FIG. 2 is a schematic street view showing a plurality of vehicles, including the host vehicle and a second vehicle that includes a CACC system compatible with the CACC system of the host vehicle, and further showing features of a dedicated short range communications network (DSRC network) for use by vehicles equipped to receive and transmit compatible communications, with at least some of the depicted vehicles having a CACC system compatible with the host vehicle and an externally perceivable indicating device in accordance with the first embodiment.
Figure 3:
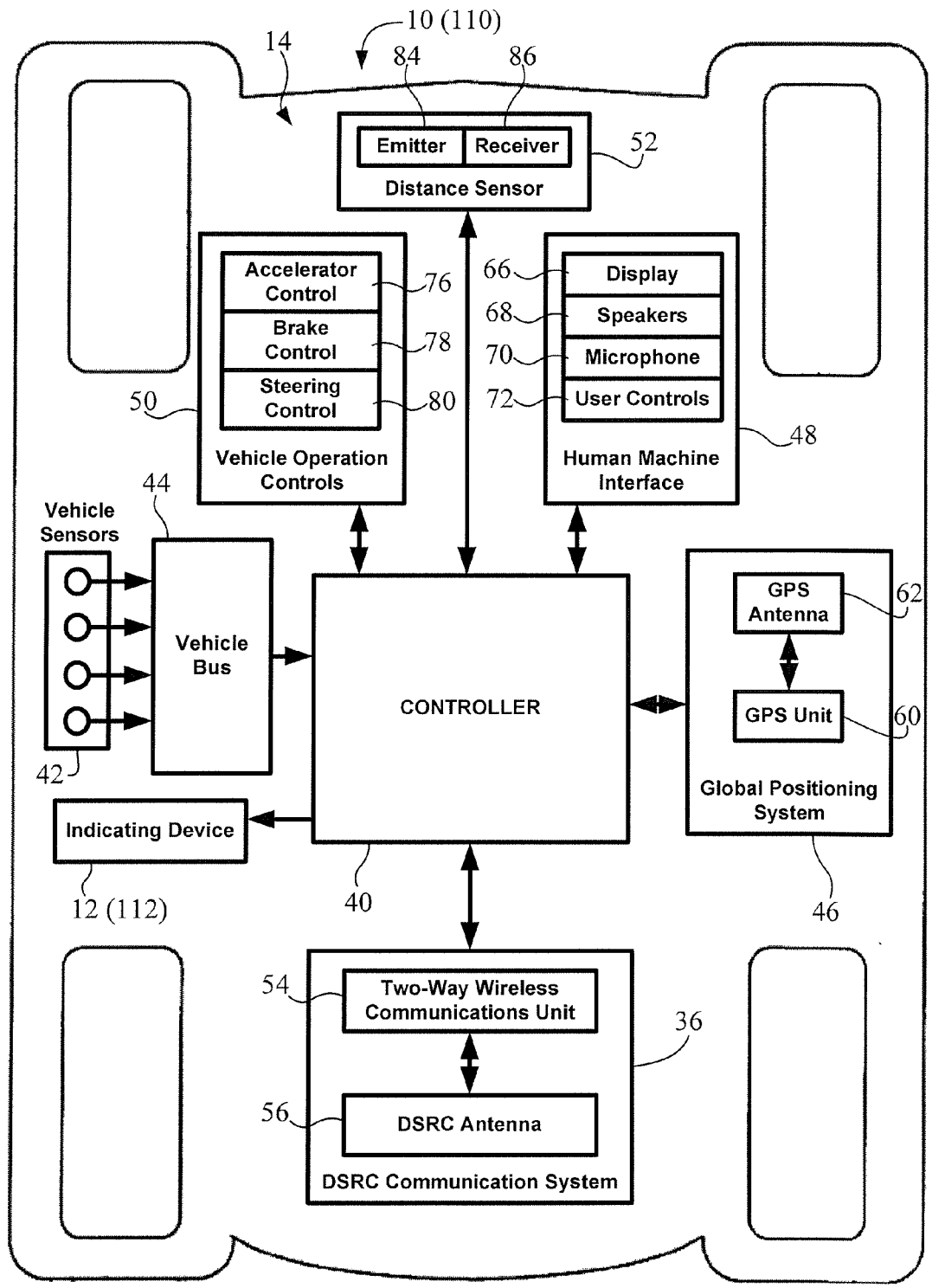
FIG. 3 is a schematic view of the host vehicle showing various features of the CACC system and connection to the externally perceivable indicating device in accordance with the first embodiment.

Although CACC systems 14 are conventional systems, a brief description of the CACC system 14 of the host vehicle 10 and related components of the CACC system 14 is now provided with specific reference to FIGS. 2 and 3. In order to better understand the CACC system 14, it should be understood that the host vehicle 10 can be equipped with wireless communication and electronics features that connect to the so-called CLARUS weather information system, which includes communications with two-way satellite services and the like. CACC systems and elements of the host vehicle 10 that access the CLARUS weather information system can be interconnected for increased functionality, however, there is no requirement that the CACC system 14 and elements of the host vehicle 10 be so interconnected.

The CACC system 14 and/or the CLARUS weather information system can both employ wireless communications between vehicles (vehicle-to-vehicle communications) and between various infrastructures, such as an external server 30, relay towers or roadside transmitter units 32 and GPS satellites 34 (only one GPS satellite 34 shown in drawings), as depicted schematically in FIG. 2.

The type of wireless communications used with the CACC system 14 depends on the vehicle manufacturer and industry standards (which continue to evolve). The CACC system 14 can include any one or combinations of wireless technologies (vehicle-to-vehicle communications) that are currently available, such as digital cellular systems, Bluetooth systems, wireless LAN systems and dedicated short range communications (DSRC) systems. Dedicated short range communications (DSRC) allow vehicles to communicate directly with other vehicles and with the roadside units 32 to exchange a wide range of information. DSRC technology can be used to provide various information between vehicles, such as providing GPS location, vehicle speed and other vehicle Parameter Identifiers (PIDs) including engine speed, engine run time, brake engagement, engine coolant temperature, barometric pressure, acceleration, vehicle target speed, etc. When communications are established from one vehicle to other vehicles in close proximity, this information provides the vehicles with a complete understanding of the vehicles in the broadcast area and driving status. This information then can be used by the vehicles for both vehicle safety applications and non-safety applications.

In the depicted embodiment, the host vehicle 10 includes a dedicated short range communications system 36 (DSRC 36) for vehicle-to-vehicle communications. However it should be understood from the drawings and the description hereinbelow that the host vehicle 10 can alternatively be provided with any one or all of the above mentioned vehicle-to-vehicle communication capabilities, and is not limited to the use of DSRC technology. The CACC system 14 is connected to the DSRC 36 of the host vehicle 10 and receives speed and location information of other vehicles from the DSRC 36 where that information is received from other vehicles. The CACC system 14 also provides speed and location information of the host vehicle 10 to the DSRC 36 and the DSRC 36 transmits that information to other vehicles. Hence, the DSRC 36 is a vehicle-to-vehicle communication device in the first embodiment of the host vehicle 10. Since DSRC systems are conventional in nature, further description of DSRC systems is omitted for the sake of brevity.

It should be understood from the drawings and the description herein that the CACC system 14 can be a stand-alone component that connects to the various electronic control systems and components within the host vehicle 10. Alternatively, as depicted in the drawings and described further below with respect to the first embodiment of the host vehicle 10, the CACC system 14 can be integrated into the electronic control systems of the host vehicle 10. Therefore, in the first embodiment, the CACC system 14 is an integrated part of the electronic control systems of the host vehicle 10. Since such electronic control systems of the host vehicle 10 are conventional, further description is omitted for the sake of brevity, except where those electronic control systems relate to the CACC system 14 of the host vehicle 10.

As shown in FIG. 3, the electronic control systems of the host vehicle 10 include the DSRC 36, a controller 40, various vehicle sensors 42, a vehicle bus 44, a global positioning system 46 (GPS 46), a human/machine interface 48, vehicle operation controls 50 and a distance sensor 52.

The DSRC 36 includes a two-way wireless communications unit 54 and a DSRC antenna 56. The DSRC 36 provides two-way communications between the host vehicle 10 and other vehicles similarly equipped within a predetermined range away from the host vehicle 10.

The controller 40 preferably includes a microcomputer with a CACC control program that controls overall functions of the CACC system 14. The controller 40 can also be configured to control conventional systems of the host vehicle 10, such as engine and/or transmission operation. The CACC control program can be a memory circuit provided with control commands and/or stored computer code. The controller 40 can also include other conventional components such as an input interface circuit, an output interface circuit, and storage devices such as a ROM (Read Only Memory) device and a RAM (Random Access Memory) device. A microcomputer of the controller 40 is programmed to control multiple operations of the host vehicle 10, including the CACC system 14. The memory circuit stores processing results and control programs such as ones for CACC system 14 and operations that are run by the processor circuit. The controller 40 is operatively coupled to the host vehicle 10 in a conventional manner. The internal RAM of the controller 40 stores statuses of operational flags and various control data. The internal ROM of the controller 40 stores algorithms, codes and instructions for various operations of the host vehicle 10. It will be apparent to those skilled in the art from this disclosure that the precise structure and algorithms for the controller 40 can be any combination of hardware and software that will carry out the functions of the present invention.

The various vehicle sensors 42 include engine temperature and pressure sensors, an engine speed sensor, a vehicle speed sensor, as well as other conventional sensors necessary for conventional operation of the host vehicle 10. The CACC system 14, being a cruise control system, regularly monitors the engine speed sensor and the vehicle speed sensor for control of the speed of the host vehicle 10.

The vehicle bus 44 is a communications bus that links the sensors 42 to the controller 40. Although not shown, various other systems and components, such as the DSRC 36, the GPS 46, the human/machine interface 48, the vehicle operation controls 50 and distance sensor 52 can also be routed through the vehicle bus 44.

The global positioning system 46 (GPS 46) is a conventional system whose operation and control can be integrated into the controller 40 or can be a stand-alone component connected to the controller 40. The GPS 46 includes a GPS Unit 60 (i.e. a display) located in the dashboard 24 of the host vehicle 10 and a GPS Antenna 62 that communicates with the various GPS satellites 34 in a conventional manner transmitting and receiving location and trajectory information of the host vehicle 10.

Figure 4:
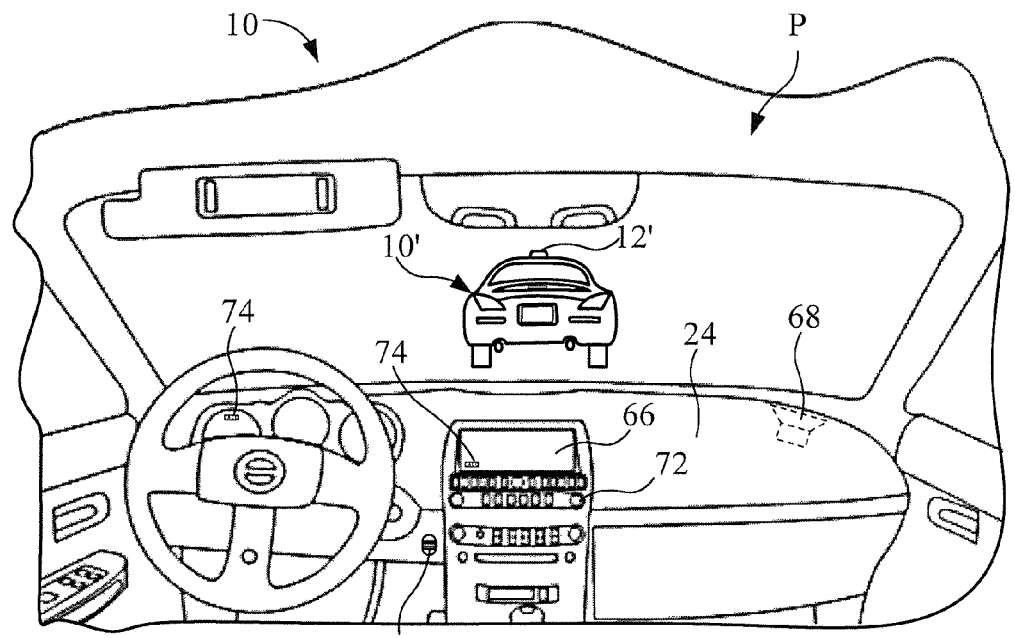
FIG. 4 is a perspective view of an interior of the host vehicle following the second vehicle, showing an instrument panel portion of the host vehicle, and further showing an optional interior indicating device of the CACC in accordance with the first embodiment.

The human/machine interface 48 is preferably located in the instrument panel (dashboard) 24 of the host vehicle 10, as shown in FIG. 4. However, alternatively, sections of the human/machine interface 48 can also include a sub-panel (not shown) on the steering wheel of the host vehicle 10. The human/machine interface 48 includes a display 66 (i.e., audio head unit display, GPS display and/or backup camera monitor), speakers 68, microphone 70, user controls 72 (radio controls, navigation controls, air conditioning and heating controls, etc.) and an internally perceivable indicator 74 that are all located on and/or within the instrument panel 24.

The vehicle operation controls 50 are conventional features, such as accelerator control 76, brake control 78 and steering control 80 (steering wheel). The accelerator control 76 includes a device that adjusts the speed of the host vehicle 10. For example, the accelerator control 76 can be an electric stepper motor or vacuum controlled motor linked to the engine and/or the driver operated gas pedal such that the CACC system 14 can directly adjust the speed of the host vehicle 10, when the CACC system 14 is engaged and in control of the speed of the host vehicle 10. Hence, the accelerator control 76 is a vehicle speed control device used when speed control (cruise control) is implemented by the CACC system 14.

The brake control 78 typically includes a brake pedal operated by the driver of the host vehicle 10 and a switch that de-activates the CACC system 14 when the brake pedal is operated. Since the accelerator control 76, the brake control 78 and the steering control 80 are conventional features of the host vehicle 10, further description is omitted for the sake of brevity.

The distance sensor 52 can be any conventional device or system that determines the distance between the host vehicle 10 and any preceding vehicle (a vehicle in front of the host vehicle 10). Distance sensors are well known in, for example, adaptive cruise control systems (ACC systems) that adjust the speed of a vehicle using feedback from the distance sensor to adjust vehicle speed with the ACC system engaged to control the speed of the vehicle.

The distance sensor 52 can be any of a variety of distance detecting device, such as a light or laser based distance measuring device, sonar, radar, or the like. In the depicted first embodiment, the distance sensor 52 is, for example, a radar system that includes an emitter 84 and a receiver 86. The emitter 84 transmits emissions (audio, light or electro-magnetic energy) and the receiver 86 receives reflected emissions from other vehicles or objects. The CACC system 14 is configured such that under certain circumstances, in response to receiving prescribed reflected emissions reflected from the other vehicle, the host vehicle 10 communicates with another vehicle (a second vehicle) to synchronize speed control in a manner described in greater detail below.

The distance sensor 52 is also useful when the CACC system 14 operates as an adaptive cruise control system (ACC system) that adjusts the speed of the host vehicle 10 in response to changes in speed of the preceding vehicle. For example, when the CACC system 14 is operating without direct vehicle-to-vehicle communications a preceding vehicle, the CACC system 14 can operate as an ACC system. ACC systems are well known and disclosed in, for example, U.S. Pat. No. 6,985,805, assigned to Nissan Motor Co., Ltd, which is incorporated herein by reference in its entirety.

As is explained in greater detail below, the CACC system 14 is configured to selectively synchronize speed control of the host vehicle 10 with at least one other vehicle 10' (a second vehicle), shown in FIG. 2. Part of the process for synchronizing speed control between two vehicles includes the CACC system 14 using a relative position detecting device or a headway detecting device. Specifically, the headway detecting device determines the position of the other vehicle 10' relative to the host vehicle 10.

The headway detecting device can be any one or a combination of the following: the DSRC 36, the GPS 46 and/or the distance sensor 52. As described above, the DSRC 36 can communicate directly with the other vehicle 10' to exchange position and trajectory information (speed and direction information). The GPS 46 can identify the position and trajectory of the host vehicle 10 and the identified position and trajectory is compared to position and trajectory information from the other vehicle 10' received via the DSRC 36. The distance sensor 52 can also determine the relative position of the other vehicle 10' with respect to the host vehicle 10 and position and trajectory information to and from the other vehicle 10' can be exchanged via the DSRC 36. Further, the GPS 46 can be used alone to communicate position and trajectory information between the two vehicles, where the GPS 46 is equipped to exchange such information. Hence, the headway detecting device of the CACC system 14 can utilize combinations of the capabilities of the DSRC 36, the GPS 46 and/or the distance sensor 52 to establish relative position and trajectory information of the host vehicle 10 relative to the other vehicle 10'.

As shown in FIG. 2, there can be several non-CACC vehicles 90 on the road near and/or between the other vehicle 10' and the host vehicle 10. More specifically, the vehicles 90 do not necessarily have a CACC system installed, or may have a CACC system without an indicating device 12 that is visible. Further, the vehicles 90 may have an adaptive cruise control system, a conventional cruise control system, or no cruise control system at all. The indicating device 12 being externally perceivable is configured to provide an indication of the operating status of the CACC system 14 of the host vehicle 10. Similarly an indicating device 12' of the other vehicle 10' also provides an indication of the operating status of the CACC system 14 of the other vehicle 10'.

Since the indicating devices 12 and 12' are externally perceivable, the driver of the host vehicle 10 can visually perceive the indicating device 12' of the other vehicle 10' once they are within visual range of one another. Similarly, the driver of the other vehicle 10' can perceive the indicating device 12 indicating the status of the CACC system 14 of host vehicle 10 once they are within visual range of one another. More specifically, the indicating device 12 of the host vehicle 10 is perceivable from the driver's seat S of the other vehicle 10' once within visual range, and the indicating device 12' of the other vehicle 10' is perceivable from the driver's seat S of the host vehicle 10 once within visual range.

As is described further below, the CACC system 14 is configured such that in response to communications with the other vehicle 10' in preparation for synchronizing their respective speed controls, the indicating device 12 provides a visual indication in concert with visual indications from the indicating device 12' (a second externally perceivable indicating device) of the other vehicle 12'. Further, the CACC system 14 is configured such that in response to communications with the other vehicle 10', the CACC system 14 synchronizes the visual indications of the indicating device 12 with the visual indications of the indicating device 12' of the other vehicle 10'.

The CACC system 14 is also connected to the internally perceivable indicator 74 located within the host vehicle 10. More specifically, the CACC system 14 is configured such that in response to communications with the other vehicle 10' to synchronize speed control therewith, the internally perceivable indicator 74 (an internally perceivable indicating device) provides indications in concert with the visual indications of the indicating device 12' of the other vehicle 10'. Consequently, the driver of the host vehicle 10 is made aware of the communications and electronic handshaking between the host vehicle 10 and the other vehicle 10'. The internally perceivable indicator 74 is preferably in an area on the instrument panel that can light up to provide a visual indication. However, it is also possible for the internally perceivable indicator 74 to include connection to an audio indicating device, such as the speaker 68. The CACC system 14 can be configured to light up internally perceivable indicator 74 and/or cause the speaker 68 to emit a distinguishable sound indicating the status of the CACC system 14.

A description of basic operations of the CACC system 14 and the indicating device 12 in accordance with a first embodiment is now provided with specific reference to FIGS. 5-9. The operation of the CACC system 14 in the first embodiment is depicted schematically in the flowchart in FIG. 5. Relative positioning of the host vehicle 10, the other vehicle 10' (a second vehicle) and vehicles 90 is depicted in FIG. 6-9.

Figure 6:
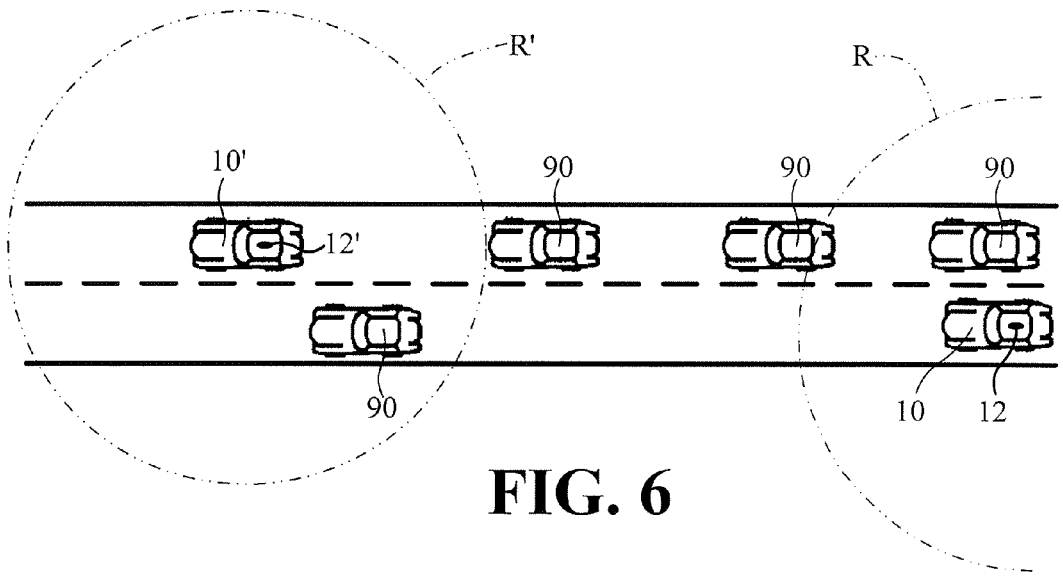
FIG. 6 is a schematic street view showing the host vehicle with the CACC system and the second vehicle that includes a compatible CACC system, where the host vehicle and the second vehicle are not within a linking range that would enable the forming of a synchronized speed controlled caravan, and hence their respective externally perceivable indicating devices are turned off in accordance with the first embodiment.

As shown in FIG. 6, a typical roadway or highway can include multiple vehicles cruising thereon. The driver of the host vehicle 10 can visually detect the visual indicator 12' of a second vehicle, i.e., the other vehicle 10'. The presence of the visual indicator 12' indicates that the other vehicle 10' has a CACC system 14 and the driver of the other vehicle 10' may be willing to link with the host vehicle 10 so that the other vehicle 10' and the host vehicle 10 can form a caravan with synchronized speed controls. The driver of the host vehicle 10 then speeds up to be nearer to the other vehicle 10' to see if the two vehicles can form a caravan, as indicated in FIG. 7.

Figure 7:
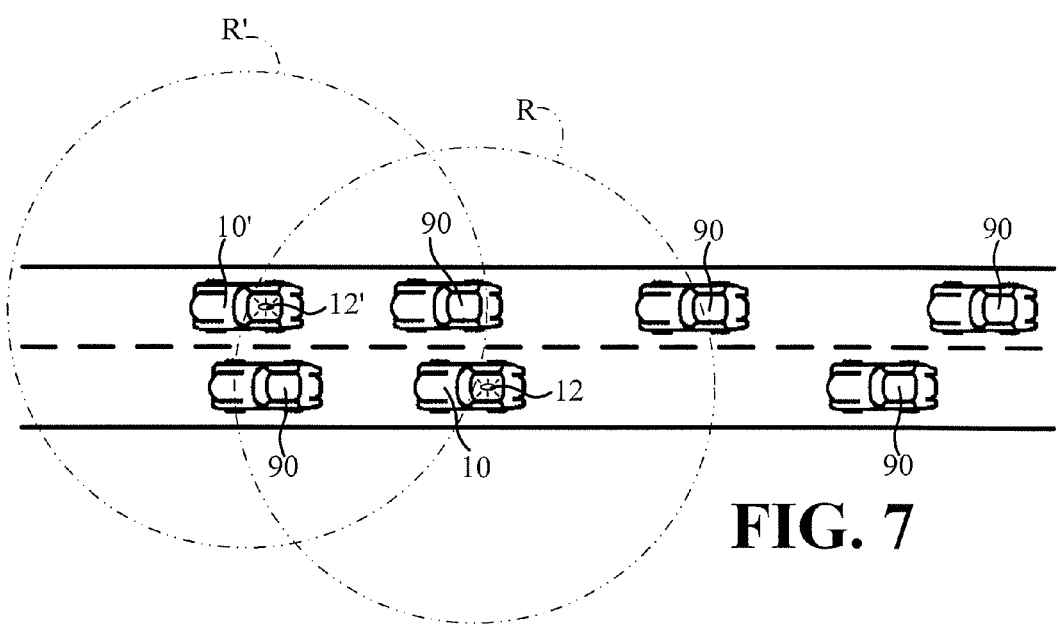
FIG. 7 is another schematic street view showing the host vehicle and the second vehicle within the linking range with respect to one another such that the vehicles automatically communicate with one another and activate their respective externally perceivable indicating devices indicating mutual capability to form the synchronized speed controlled caravan in accordance with the first embodiment.

In FIG. 7, the host vehicle 10 and the other vehicle 10' are within each other's linking range R and R'. The linking range R and linking range R' are predetermined distances between the two vehicles that define a limited range in which the vehicles must be located in order to link for synchronized speed control. This predetermined distance (linking range) is defined as the minimum distance that can exist between the host vehicle 10 and the other vehicle 10' for their respective CACC systems 14 to link together and synchronize their respective speed controlling activities. In other words, the host vehicle 10 must be within the linking range R' of the other vehicle 10' in order for the CACC system 14 of the other vehicle 10' to consider linking with the CACC system 14 of the host vehicle 10. Similarly, the other vehicle 10' must be within the linking range R of the host vehicle 10 in order for the CACC system 14 of the host vehicle 10 to consider linking with the CACC system 14 of the other vehicle 10'.

It should be understood from the drawings and the description herein that the relative distances depicted in FIGS. 6-9 are schematic only and are merely for demonstration purposes and are not to any specific scale. For instance, the vehicles depicted appear to be relatively close to one another. However, they are not intended to appear to be tailgating one another, but rather show schematic relationships between vehicles to demonstrate the operation of the CACC system 14 and indicating device 12. Further, the linking range R and the linking range R' do not necessarily have fixed dimensions, but may vary depending upon circumstances. For example, the linking ranges R and R' can be adjusted depending upon vehicle speed or may be a predetermined fixed distance.

Figure 5:
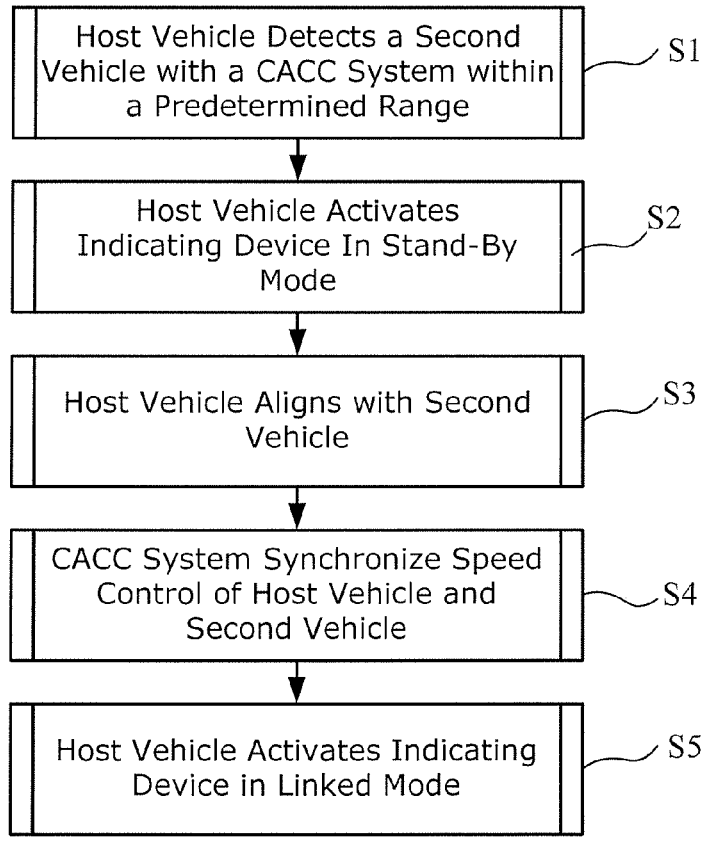
FIG. 5 is a flowchart outlining basic operations of the CACC system of the host vehicle and the externally perceivable indicating device in accordance with the first embodiment.

It should be understood, that once the host vehicle 10 and the other vehicle 10' are within communication distance with one another, the DSRCs 36 of the vehicles communicate with one another, checking each other's relative location and trajectory, which is a part of the operation of step S1 in FIG. 5. However, relative distance between the host vehicle 10 and the other vehicle 10' can also be determined via the GPS 46 or by detection via the distance sensor 52.

As shown in FIG. 7, the host vehicle 10 has moved to within the linking range R' of the other vehicle 10', and the host vehicle 10 recognizes that the other vehicle 10' is within the linking range R of the host vehicle 10. The relationships depicted in FIG. 7 correspond to circumstances necessary for the controller 40 of the CACC system 14 to accomplish step S1 in FIG. 5. Specifically, at step S1, the CACC system 14 of the host vehicle 10 establishes that the other vehicle 10' (the second vehicle) is within the predetermined range or linking range R and it is possible for a link to form between the host vehicle and the other vehicle 10'.

At step S2 in FIG. 5, the CACC 14 of the host vehicle 10 activates the indicating device 12 in a stand-by mode indicating to the driver of the other vehicle 10' an interest in forming a caravan. Similarly, the CACC 14 of the other vehicle 10' activates the indicating device 12' in a stand-by mode indicating to the driver of the host vehicle 10 an interest in forming a caravan.

Figure 8:
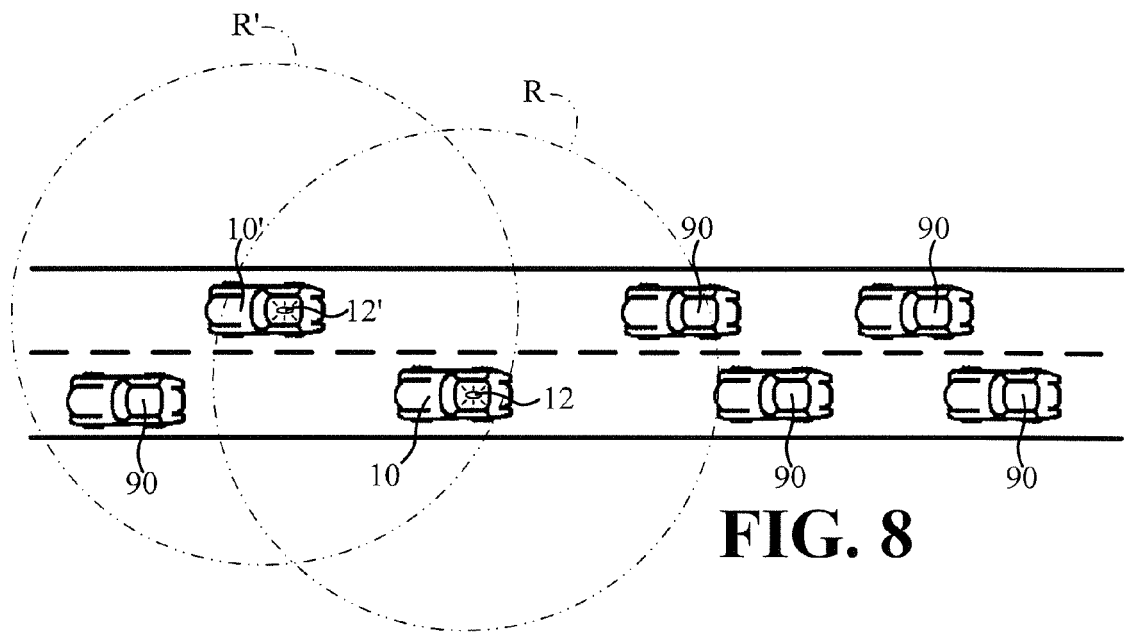
FIG. 8 is another schematic street view showing the host vehicle and the second vehicle with their respective drivers recognizing that their externally perceivable indicating devices operating in a stand-by mode, signaling the possibility of forming a caravan in accordance with the first embodiment.
Figure 9:
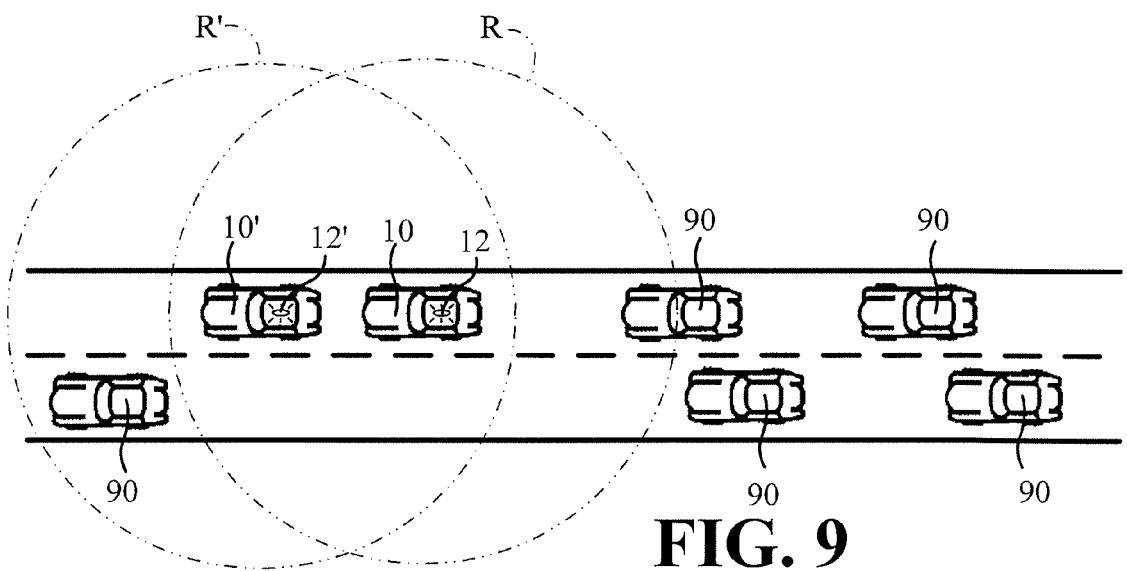
FIG. 9 is yet another schematic street view showing one of the host vehicle and the second vehicle following the other, thereby positioning their vehicles for linking together for synchronized speed control in a caravan with their respective externally perceivable indicating devices signaling the establishment of the synchronized speed controlled caravan in accordance with the first embodiment.

In FIG. 7, one of the vehicles 90 is in the way, preventing the host vehicle 10 from moving into position behind the other vehicle 10'. After some jockeying, as shown in FIG. 8, the vehicle 90 moves back or the other vehicle 10' speeds up providing an opening behind the other vehicle 10'. As depicted in FIG. 9, the host vehicle 10 maneuvers into position behind the other vehicle 10'. The CACC system 14 of the host vehicle 10 recognizes that the host vehicle 10 is in position for forming a caravan with the other vehicle 10', as represented at step S3 in FIG. 5. The CACC system 14 of the host vehicle 10 recognizes the position of the host vehicle 10 via the distance sensor 52 and/or the GPS 46.

At step S4 in FIG. 5, the CACC system 14 of the host vehicle 10 synchronizes its cruise control or speed control with the CACC system 14 of the other vehicle 10', establishing a caravan. At step S5 in FIG. 5, the CACC system 14 of the host vehicle 10 activates the indicating device 12 to indicate that the host vehicle 10 is in a linked mode. In the linked mode, speed control of the host vehicle 10 is synchronized with the speed of the other vehicle 10'. Further, the CACC system 14 of the other vehicle 10' activates the indicating device 12' to indicate that the other vehicle 10' is also in the linked mode.

It should be understood from the drawings and description herein, that step S1 can be carried out regardless of whether or not the CACC system 14 of the host vehicle 10 and/or the other vehicle 10' is engaged or not. Specifically, the speed of the host vehicle 10 can be controlled manually by the driver and still engage in the operations of steps S1 thru S3 of the flowchart in FIG. 5. The CACC system 14 can automatically engage in step S4 of FIG. 5, if the driver is willing and interested in becoming part of a caravan.

The stand-by mode and the linked mode can be indicated (and distinguished from one another) by the respective indicating devices 12 and 12' in any of a variety of ways. For example, the stand-by mode can be indicated by a steady non-blinking light and/or by illumination with a first color. The linked mode can be indicated by a flashing light, blinking light or light that gradually cycles between dimming and brightening and/or by illumination by a second color different from the first color. It should be understood from the drawings and description herein that the stand-by mode and the linked mode can easily be distinguished from one another by any of a variety of visually distinctive means and is not limited to blinking, flashing or dimming lights.

Further, in the stand-by mode, the respective CACC systems 14 of the host vehicle 10 and the other vehicle 10' can synchronize operation of the indicating devices 12 and 12' such that they blink and/or dim and brighten in a synchronized manner to indicated that the two vehicles have communicated with one-another and are preparing to link together for synchronized speed control.

It is also possible to provide the indicating devices 12 and 12' with more sophisticated signaling modes, for example, as discussed below in the second embodiment.

Further, it is also possible for the CACC system 14 of the host vehicle 10 and the CACC system 14 of the other vehicle 10' to negotiate with one another to determine which vehicle should lead and which vehicle should follow. For example, the GPS 46 may include destination data or expected travel path data. The CACC system 14 of the host vehicle 10 and the CACC system 14 of the other vehicle 10' can include logic to determine that the vehicle with the farthest destination should lead and therefore the other vehicle should follow. Such information can be exchanged between vehicles and provided via the human machine interface 48 (for example, the display 66 and/or the speakers 68) to the drivers of each the vehicle.

Hence, the externally perceivable indicating device 12 is configured to indicate the following operating modes of the CACC system 14 of the host vehicle 10: an unlinked mode where the externally perceivable indicating device 12 is not operated; the stand-by mode where the externally perceivable indicating device 12 is operated to indicated a desire to form a caravan; and a linked mode where the host vehicle 10 and the other vehicle 10' are linked synchronizing their respective cruise control systems to form a caravan.

Second Embodiment

Referring now to FIGS. 10-15, a host vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The host vehicle 110 is identical to the host vehicle 10 except that the indicating device 12 of the host vehicle 10 has been replaced with an indicating device 112. Specifically, the host vehicle 110 includes all the features described above with respect to the host vehicle 10 of the first embodiment, except that the host vehicle 110 includes a slightly more sophisticated indicating device 112, as described below. More specifically, the host vehicle 110 includes all of the features, components, devices and systems of the CACC system 14. Hence, description of the CACC system 14 (FIG. 3) presented above in the first embodiment is unchanged in the second embodiment, except that the indicating device 12 has been replaced with the indicating device 112.

Figure 10:
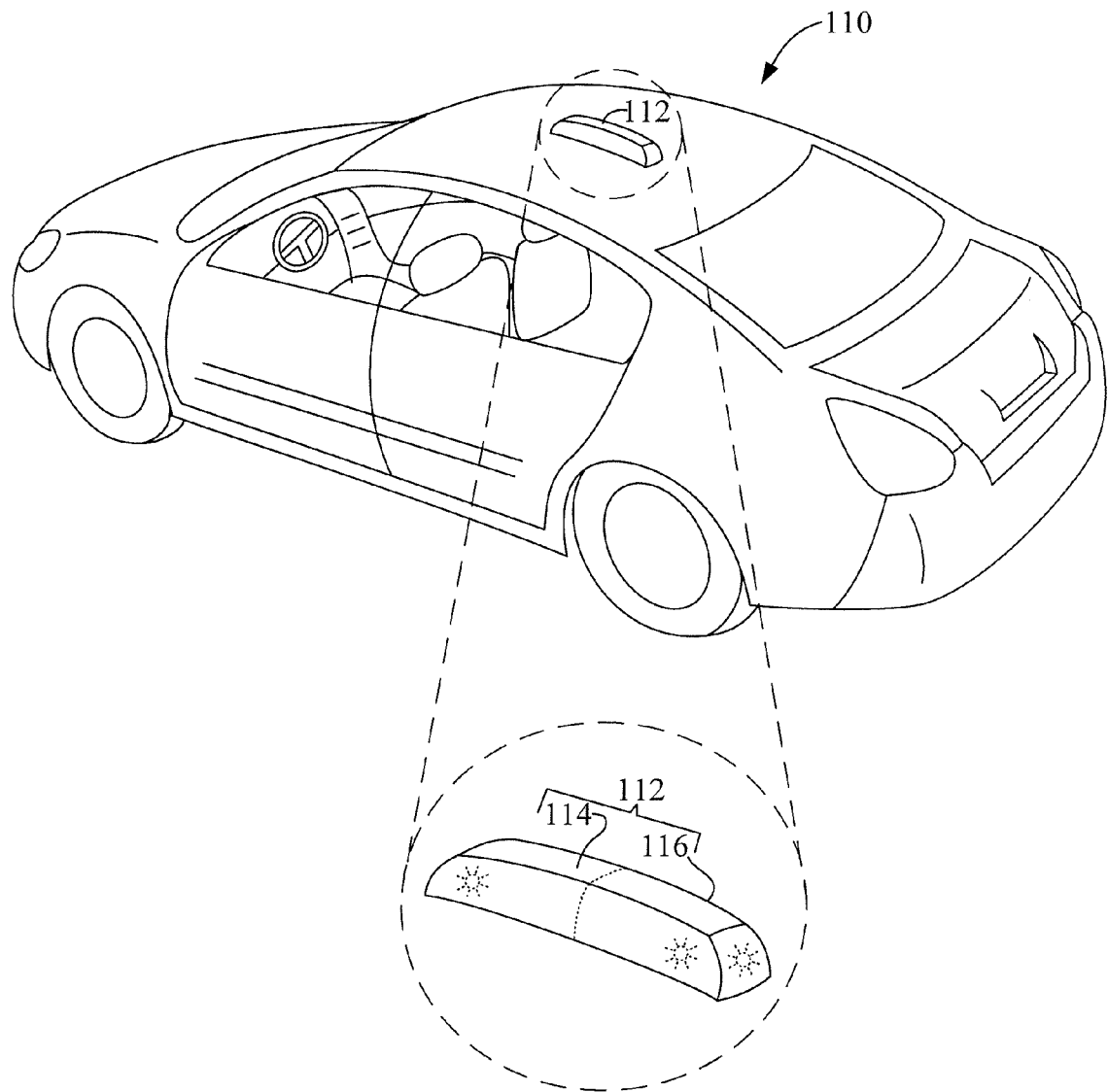
FIG. 10 is a perspective view of a host vehicle that includes a CACC system and an externally perceivable indicating device in accordance with a second embodiment.

As shown in FIG. 10, the indicating device 112 includes a front section 114 and a rear section 116. The front section 114 and the rear section 116 of the indicating device 112 are independently controlled by the CACC system 14 of the host vehicle 110.

Operation of the CACC 14 of the host vehicle 110 and the indicating device 112 is described below with specific reference to FIGS. 11, 12 and 13.

Figure 11:
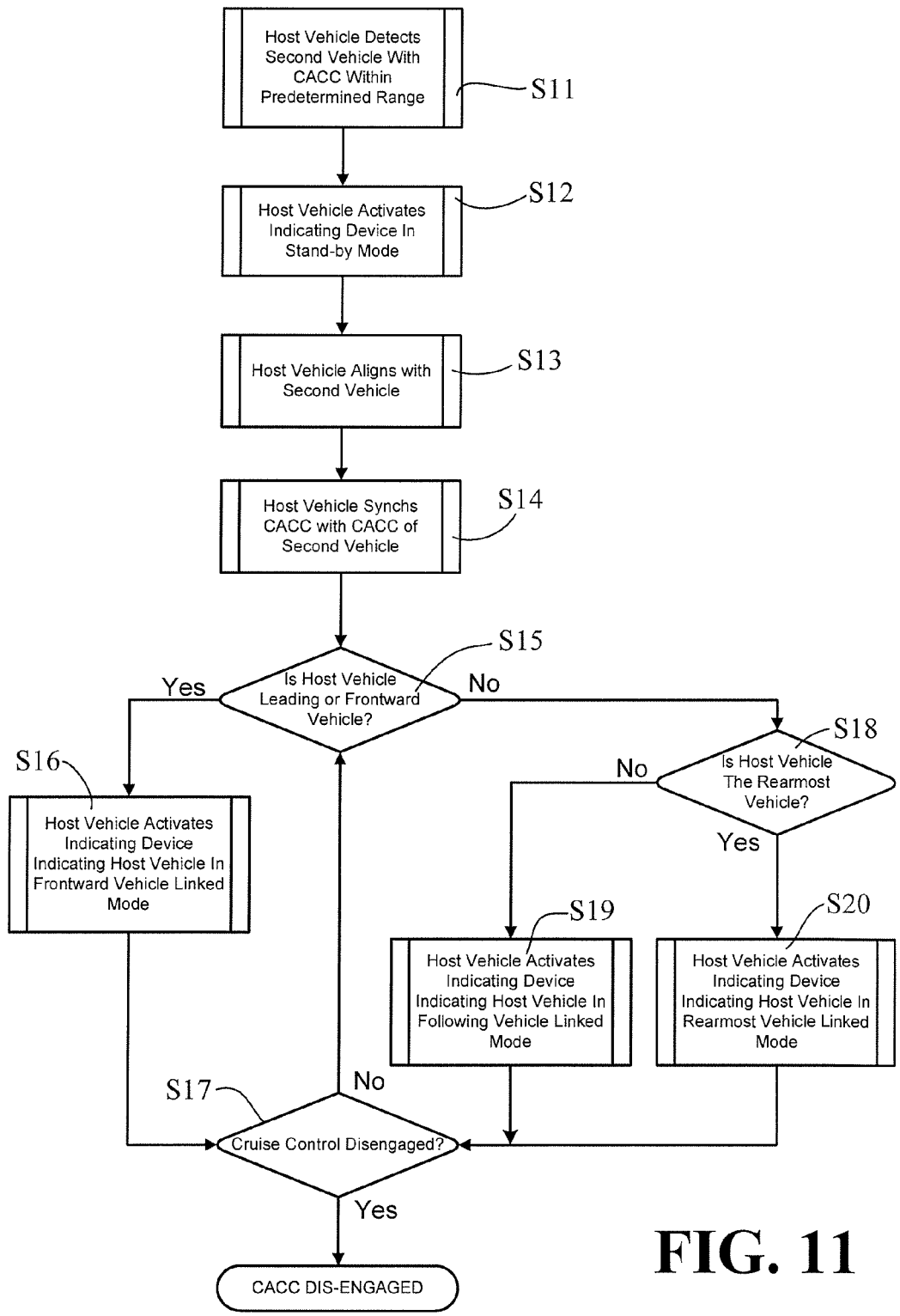
FIG. 11 is a flowchart outlining operation of the CACC system and the externally perceivable indicating device in accordance with the second embodiment.

At step S11 of FIG. 11, the host vehicle 110 detects that a second vehicle 110' is within a linking range R (a predetermined range) of the host vehicle 110. At step S12, the CACC system 14 of the host vehicle 110 activates the indicating device 112 in a stand-by mode. At step S13, the host vehicle aligns with the second vehicle 110', either in front of the second vehicle 110' or behind the second vehicle 110'. At step S14, the host vehicle 110 links to the second vehicle 110', thereby synchronizing speed control with the second vehicle 110'.

It should be understood from the drawings and description herein, that steps S11-S13 can be carried out regardless of whether or not the CACC system 14 of the host vehicle 110 and/or the other vehicle 110' is engaged or not. Specifically, the speed of the host vehicle 110 can be controlled manually by the driver and still engage in the operations represented in steps S11 thru S13 in the flowchart in FIG. 11. The CACC system 14 can automatically engage in step S14 of FIG. 11, if the driver is willing and interested in becoming part of a caravan, or the driver can be presented with the option via the human/machine interface 48 to manually engage the CACC system 14 of the host vehicle 10 to synchronize with the CACC system 14' of the second vehicle 10'.

At step S15, a determination is made: is the host vehicle 110 a leading vehicle or frontward vehicle with the second vehicle 110' following the host vehicle 110? If the answer is "yes", then operation moves to step S16 where the CACC system 14 of the host vehicle 110 activates the rear section 116 of the indicating device 112 in a frontward vehicle linked mode to indicate that the host vehicle 110 is leading the second vehicle 110'. Operations then move to step S17. If the answer to the question in step S15 is no, then operations move to step S18. At step S18, another decision is made: is the host vehicle 110 the rearmost vehicle in the caravan? If no, then operation moves to step S19 where the CACC system 14 activates both the front section 114 and the rear section 116 in a following vehicle linked mode indicating that the host vehicle 110 is following the second vehicle 110' and another vehicle 110" is following the host vehicle 110. If yes, then operation moves to step S20 where the CACC system 14 activates the front section 114 to operate in a rearmost vehicle linked mode, indicating that the host vehicle 110 is the trailing vehicle in the caravan. Thereafter, operation moves to step S17 where the CACC system 14 checks to see if the cruise control is engaged or dis-engaged. If the CACC system 14 is still engaged, operations return to step S15.

In a manner similar to the first embodiment, the stand-by mode can be indicated by having either or both the front section 114 and the rear section 116 of the indicating device 112 emit a steady light, a flashing light, a blinking light or light that gradually cycles between dimming and brightening, or by illumination with a first color. Further, the stand-by mode may optionally be utilized by the CACC system 14 to indicate whether the host vehicle 110 is better suited as the frontward (leading) vehicle or being the following vehicle, depending upon which of the front section 114 and the rear section 116 is operating in the stand-by mode. For example, the CACC system 14 can be configured to compare final destinations of the host vehicle 110 and the second vehicle 110' by comparing data entered into the GPS 46. If the host vehicle 110 has a final destination that will be reached sooner than a final destination of the second vehicle 110', then the host vehicle 110 will likely leave the caravan and the highway sooner than the second vehicle 110'. In such a circumstance, the host vehicle 110 is designated as the following vehicle in the caravan. The stand-by mode can be configured to include a signal that includes lighting a selected one of the front section 114 and the rear section 116 to indicate the order of vehicles in the caravan. In other word, the activating of the (externally perceivable) indicating device 112 includes providing an indication to the second vehicle 110' of a desired order between the host vehicle 110 and second vehicle 110' relative to the caravan.

Figure 12:
FIG. 12 is a schematic side view showing two vehicles where one vehicle provides an indication of being a lead vehicle in the caravan and the host vehicle provides an indication of being a tailing vehicle with no vehicles following it in the caravan in accordance with the second embodiment.
Figure 13:
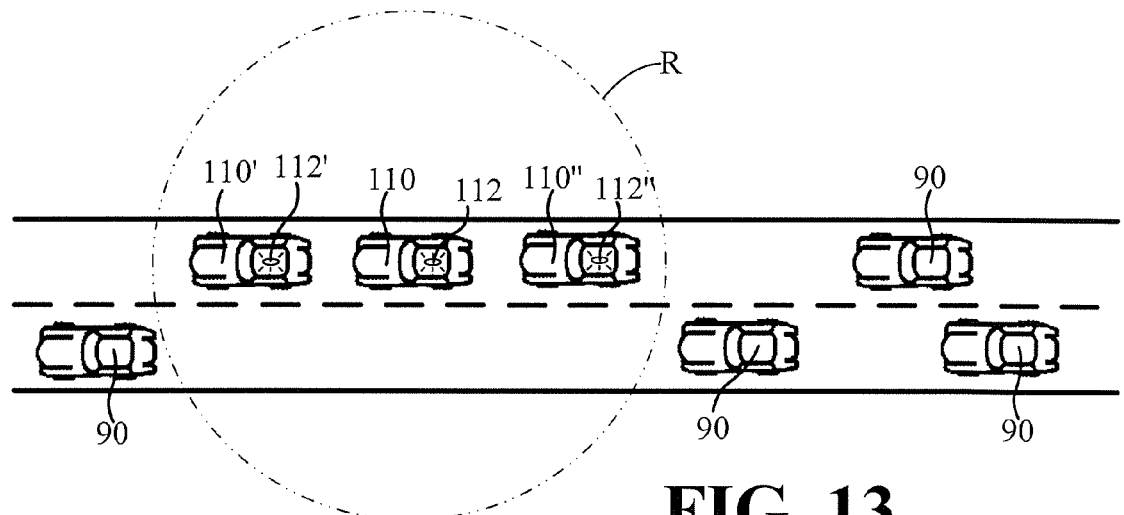
FIG. 13 is a schematic street view showing a plurality of vehicles traveling in a caravan where at least three vehicles are synched with each other, each of the plurality of vehicles having compatible CACC systems in accordance with the second embodiment.

An example of two of the lighting modes is shown in FIG. 12, where the host vehicle 110 is a rearmost vehicle and the second vehicle 110' is a leading vehicle. Specifically, as shown in FIG. 12, the rear section 116' of the indicating device 112' of the second vehicle 110' is activated, and the front section 112' is deactivated, indicating that the second vehicle 110' is in the frontward vehicle linked mode, linked for synchronized speed control with the host vehicle 110. The front section 114 of the indicating device 112 of the host vehicle 110 is activated, and the rear section 116 is deactivated, indicating that the host vehicle 110 is in the rearmost vehicle linked mode and is the rearmost or tailing vehicle in the caravan.

An example of each of the linked modes: the frontward vehicle linked mode, the following vehicle linked mode and the rearmost vehicle linked mode is best demonstrated in FIG. 14, and explained below after a description of FIG. 13. FIG. 13 shows three vehicles in a caravan with their CACC systems 14 all linked for synchronized speed control. In FIG. 13, the host vehicle 110 is a following vehicle, the second vehicle 110' is the leading vehicle and a third vehicle 110" is the rearmost or rearward vehicle in the caravan. In each vehicle, their respective CACC systems 14 are activating their respective indicating devices 112, 112' and 112".

Figure 14:
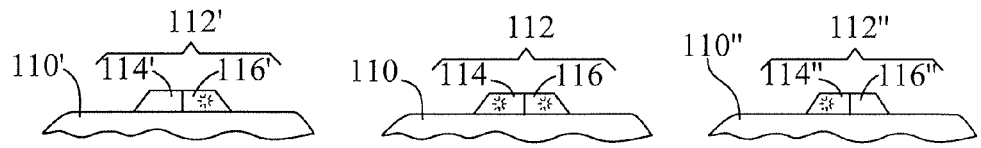
FIG. 14 is a schematic side view showing three vehicles depicted in FIG. 12, where one vehicle provides an indication of being a lead vehicle in the caravan where all the vehicles in the caravan are linked with synchronized speed controls, the host vehicle provides an indication of being a following vehicle and of being a vehicle that is further being followed by another vehicle, and a third vehicle that provides an indication of being a tailing vehicle with no vehicles following it in the caravan in accordance with the second embodiment.

In FIG. 14, the front section 114' of the indicating device 112' of the second vehicle 110' is not activated (not emitting light). However, the rear section 116' of the indicating device 112' of the second vehicle 110' is activated, providing an indication that the second vehicle 110' is linked for synchronized cruise control with at least one other vehicle, and is the lead vehicle in the caravan. Hence, the indicating device 112' of the second vehicle 110' is activated in the frontward vehicle linked mode. FIG. 14 also shows the front section 114 and the rear section 116 of the indicating device 112 of the host vehicle 110 are both activated, or illuminated, providing an indication that the host vehicle 110 is linked for synchronized speed control with at least two other vehicles in the caravan, one vehicle being forward from the host vehicle 110 and one vehicle being rearward from the host vehicle 110. Hence, the indicating device 112 of the host vehicle 110 is activated in the following vehicle linked mode. Finally, FIG. 13 shows the rear section 116" of the indicating device 112" of the third vehicle 110" is not activated (not emitting light) and the front section 114" of the indicating device 112" of the third vehicle 110" is activated, providing an indication that the third vehicle 110" is linked for synchronized cruise control with at least one other vehicle, and is the rearmost or tailing vehicle in the caravan. Hence, the indicating device 112" of the third vehicle 110" is activated in the rearmost vehicle linked mode.

Figure 15:
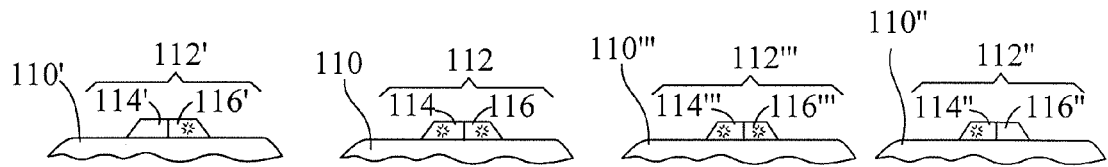
FIG. 15 is a schematic side view showing four vehicles similar to those depicted in FIGS. 13 and 14, where one vehicle provides an indication of being a lead vehicle in the caravan where all the vehicles in the caravan are linked with synchronized speed controls, the host vehicle and a third vehicle provide indications of being following vehicles and of being vehicles that are further being followed by another vehicle, and a fourth vehicle that provides an indication of being a tailing vehicle with no vehicles following it in the caravan in accordance with the second embodiment.

FIG. 15 shows a circumstance where more than three vehicles are in the caravan, all linked together for synchronized speed control. Like the circumstance shown in FIG. 14, the host vehicle 110 is a following vehicle, the second vehicle 110' is the leading vehicle, the third vehicle 110" is the rearmost vehicle in the caravan and a fourth vehicle 110'" is also a following vehicle located in the caravan between the host vehicle 110 and the third vehicle 110". In each vehicle, their respective CACC systems 14 are activating their respective indicating devices 112, 112', 112" and 112", with the indicating device 112 and 112'" having both front and rear sections 114, 114'", 116 and 116'" illuminated in accordance with the following vehicle linked mode.

Hence, in the second embodiment (and in the third, fourth and fifth embodiments) the front section 114, and the rear section 116 of the indicating device 112 can be operated in the following modes, such that: in an unlinked mode the indicating device 112 is not operated; in the stand-by mode one or both of the front section 114 and rear section 116 are selectively operated to indicated a desired position of the host vehicle 110 relative to the other vehicles; in the frontward vehicle linked mode only the rear section 116 of the indicating device 112 is operated; in following vehicle linked mode both the front section 114 and the rear section 116 are operated; and in the rearward vehicle linked mode only the front section 114 of the indicating device 112 is operated.

Third Embodiment

Figure 16:
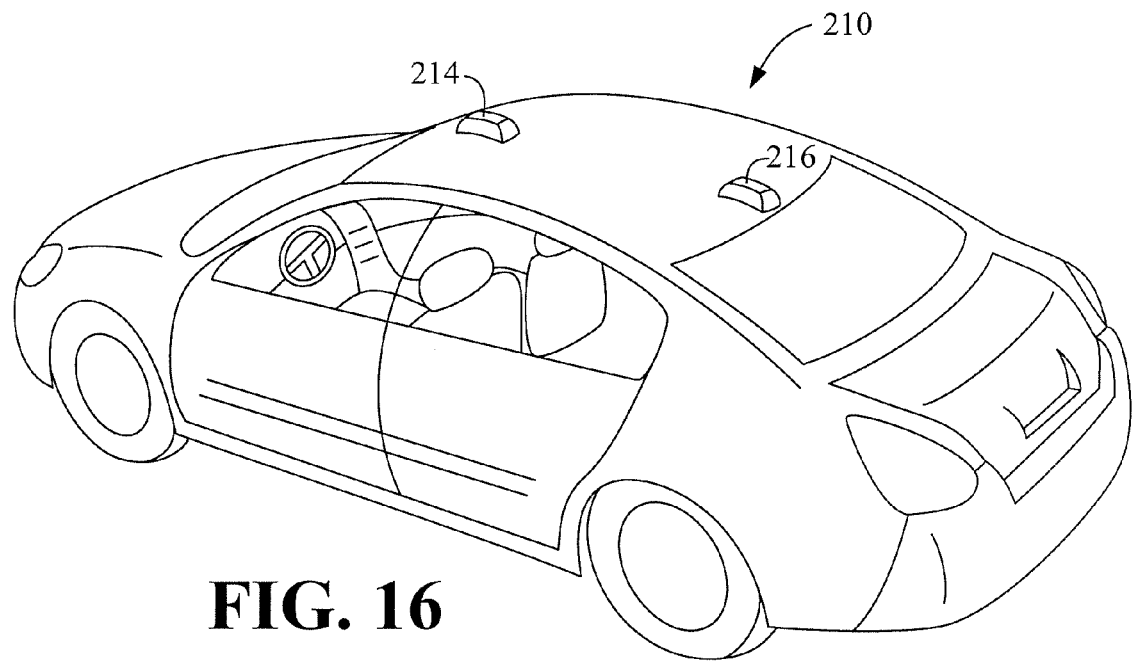
FIG. 16 is a perspective view of a host vehicle that includes a CACC system and an externally perceivable indicating device in accordance with a third embodiment.

Referring now to FIG. 16, a host vehicle 210 in accordance with a third embodiment will now be explained. In view of the similarity between the first, second and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Basically, the host vehicle 210 in accordance with the third embodiment is identical to the host vehicle 110 of second embodiment except that the indicating device 112 of the second embodiment is replaced by a two part indicating device that includes separated front portions 214 and rear portion 216. The host vehicle 210 include the CACC system 14 of the first and second embodiment and operates the front portion 214 and the rear portion 216 of the indicating device of the third embodiment in a manner that is the same that described above with respect to the second embodiment.

As shown in FIG. 16, the front portion 214 and the rear portion 216 of the indicating device are installed on the roof of the vehicle 210, but are separated from one another, with the front portion 214 being located near a front edge of the roof and the rear portion 216 being located near a rear edge of the roof of the host vehicle 210.

Fourth Embodiment

Figure 17:
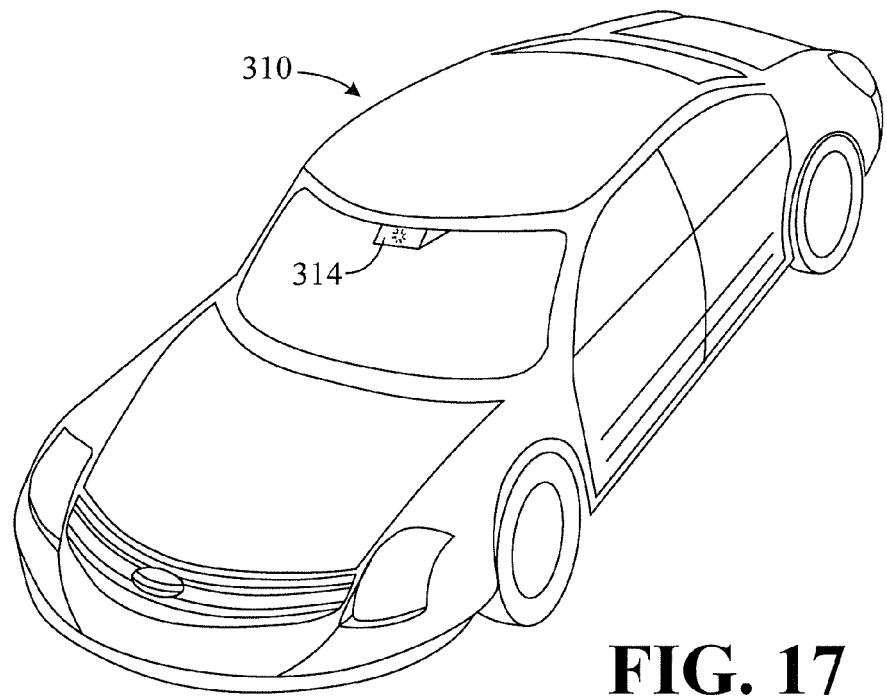
FIG. 17 is a front perspective view of a host vehicle that includes a CACC system and an externally perceivable indicating device in accordance with a fourth embodiment.
Figure 18:
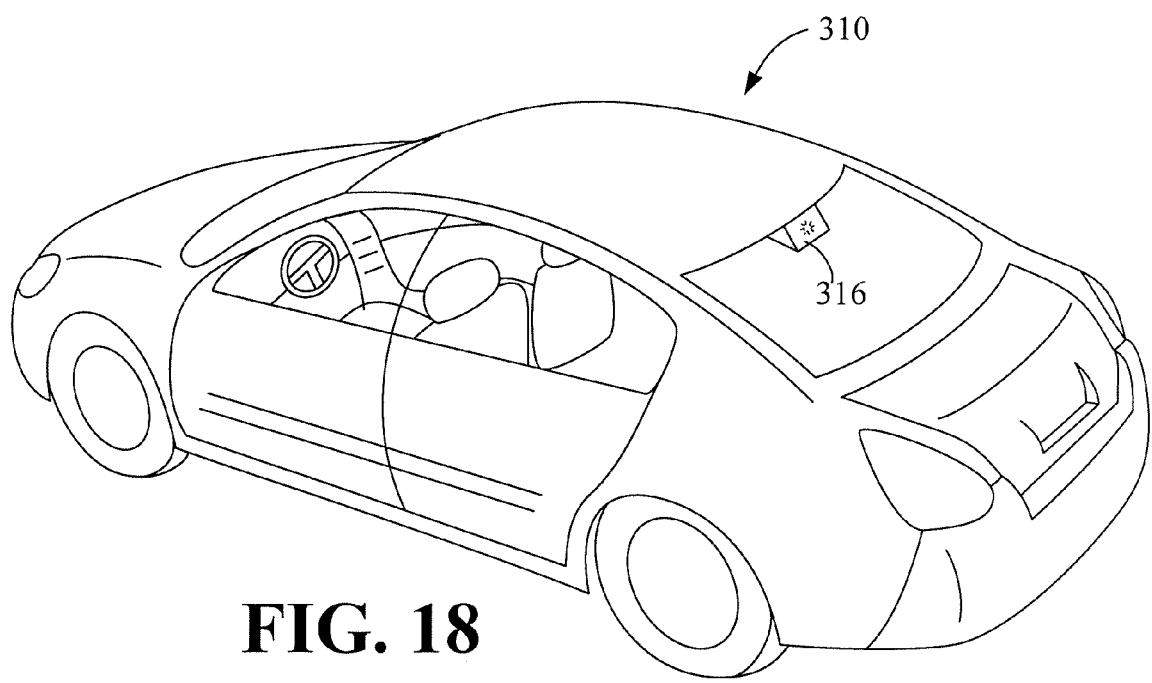
FIG. 18 is a rear perspective view of the host vehicle that includes a CACC system and the externally perceivable indicating device in accordance with the fourth embodiment.

Referring now to FIGS. 17 and 18, a host vehicle 310 in accordance with a fourth embodiment will now be explained. In view of the similarity between the first, second and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Basically, the host vehicle 310 in accordance with the fourth embodiment is identical to the host vehicle 110 of second embodiment except that the indicating device 112 of the second embodiment is replaced by a two part indicating device that includes separated front portions 314 and rear portion 316. The host vehicle 310 includes the CACC system 14 of the first and second embodiment and operates the front portion 314 and the rear portion 316 of the indicating device of the fourth embodiment in a manner that is the same that described above with respect to the second embodiment.

As shown in FIGS. 17 and 18, the front portion 314 and the rear portion 316 of the indicating device are installed within the passenger compartment of the vehicle 310, and are separated from one another. The front portion 314 is located near the front windshield and the rear portion 316 is located near a rear window of the host vehicle 310. More specifically, the front portion 314 and the rear portion 316 of the externally perceivable indicating device of the fourth embodiment is fixed to an internal surface of the host vehicle 310.

Fifth Embodiment

Figure 19:
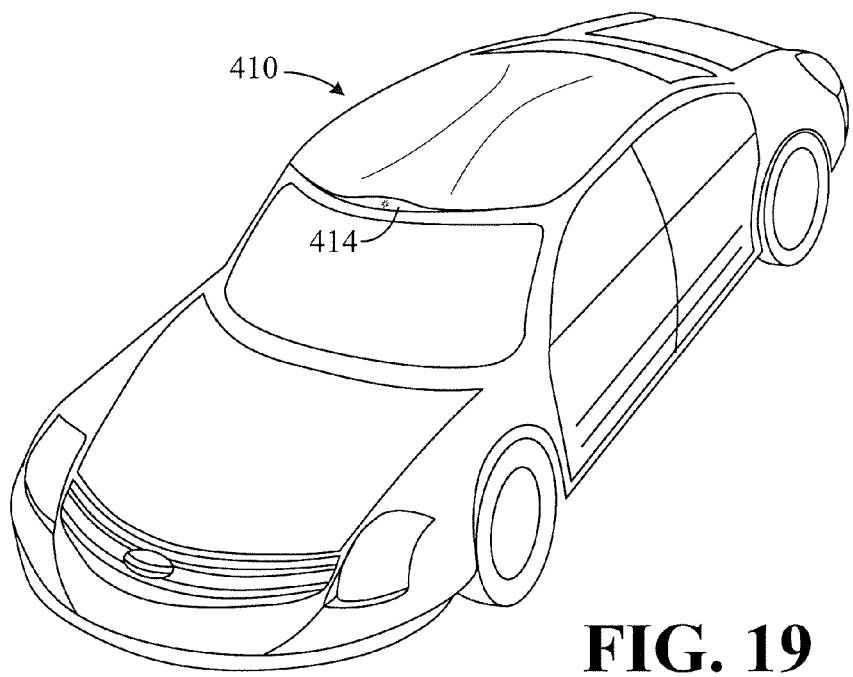
FIG. 19 is a front perspective view of a host vehicle that includes a CACC system and an externally perceivable indicating device in accordance with a fifth embodiment.
Figure 20:
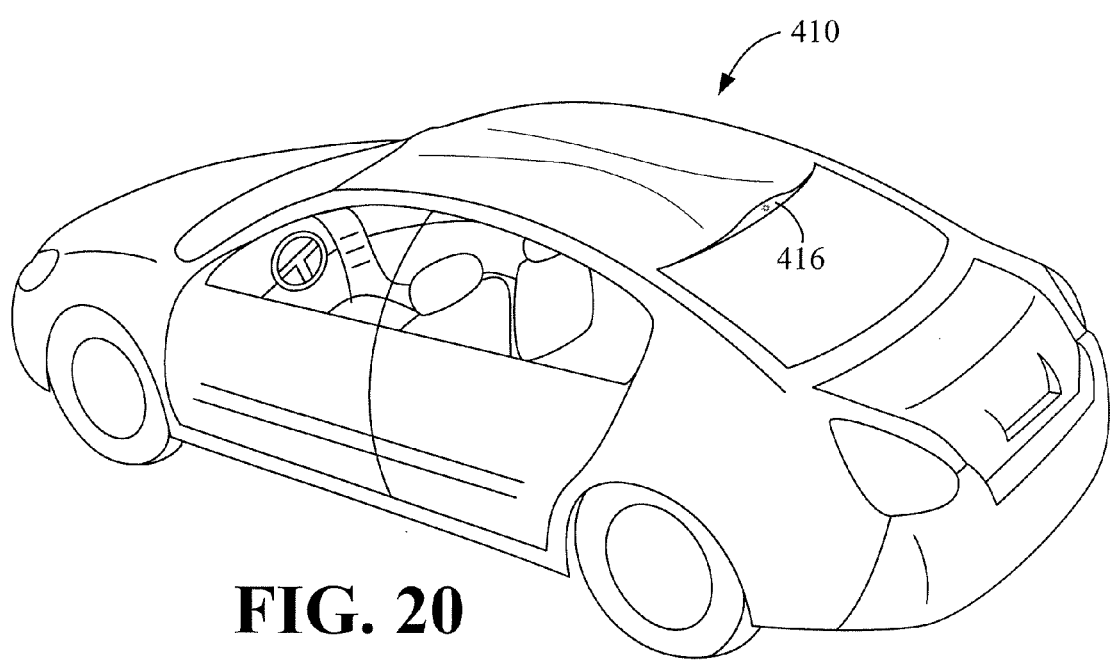
FIG. 20 is a rear perspective view of the host vehicle that includes a CACC system and the externally perceivable indicating device in accordance with the fifth embodiment.

Referring now to FIGS. 19 and 20, a host vehicle 410 in accordance with a fifth embodiment will now be explained. In view of the similarity between the first, second and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

Basically, the host vehicle 410 in accordance with the fifth embodiment is identical to the host vehicle 110 of second embodiment except that the indicating device 112 of the second embodiment is replaced by a two part indicating device that includes separated front portions 414 and rear portion 416. The host vehicle 410 includes the CACC system 14 of the first and second embodiment and operates the front portion 414 and the rear portion 416 of the indicating device of the fourth embodiment in a manner that is the same that described above with respect to the second embodiment.

As shown in FIGS. 19 and 20, the front portion 414 and the rear portion 416 of the indicating device are installed within the roof structure of the vehicle 410 in a stylized manner, partially concealing the front portion 414 and the rear portion 416. Further, the front portion 414 and the rear portion 416 are completely separated from one another. The front portion 414 is located above the front windshield and the rear portion 416 is located above a rear window of the host vehicle 310. The roof of the host vehicle 410 is provided with styling, such that the respective roof lines above the front windshield and the rear window are contoured, with an unobtrusive shape. In a preferred embodiment of the present invention, the indicating device can be semi-concealed within the styling and design of the host vehicle, such as is depicted in FIGS. 19 and 20.

It should be understood from the drawings and the description herein, that the indicating device of the CACC system 14 can be completely hidden or partially hidden in the design of the vehicle, only becoming visible when activated in either the standby mode or the linked mode. It should further be understood from the drawings and description herein that the indicating device of the CACC system 14 can be located at any convenient location on or within the host vehicle, as long as the indicating device of the CACC system 14 is observable (visible) from other vehicles once activated.

The various features of the host vehicles 10, 110, 210, 310 and 410 such as engine and passenger compartment elements are conventional components that are well known in the art. Since these various features are well known in the art, these structures will not be discussed or illustrated in detail herein. Rather, it will be apparent to those skilled in the art from this disclosure that the components can be any type of structure and/or programming that can be used to carry out the present invention.

With the embodiments of the host vehicles 10, 110, 210, 310 and 410 described above including the CACC system 14, it is possible to form a procession or caravan where the participants of the caravan (the vehicle drivers) can easily identify other vehicles expressing an interest in forming a caravan. Additionally, drivers of non-participating vehicles can easily identify an existing or a forming caravan of CACC-enabled vehicles and courteously maneuver their vehicles to allow the vehicles in the caravan to remain a cohesive group or make room for the participating vehicles to form the caravan. A plurality of vehicles can have vehicle-to-vehicle communications and form a caravan that reduces fuel consumption while providing a safe driving environment. Such an arrangement is advantageous over, for example, adaptive cruise control systems (ACC systems) where only a forward looking sensor (such as radar or sonar) measures the distance between a host vehicle and a forward or front vehicle in order to adjust speed of the host vehicle in order to maintain a predetermined distance or headway between the host vehicle and the preceding vehicle.

The CACC system 14 additionally uses vehicle-to-vehicle communication to share trajectory, position and speed information. Since the vehicles can accumulate this information from all of the preceding vehicles and communicate the accumulated information to the next following vehicle, the following vehicles receive all of the relevant information at once, thus reducing the time needed to wait for the preceding vehicles to stabilize headway distance.

The forming of a caravan of vehicles linked for synchronized speed control allows for reduced following distances between vehicles which can lead to more efficient lane usage on a highway. Synchronizing the indicating devices using patterned flashing, for example, amongst all vehicles in a caravan indicates the presence of the caravan and identifies all CACC vehicles within that caravan for the benefit of non-CACC vehicles. Further when several different caravans are active on a stretch of highway, each caravan can identify itself by providing a separate color illumination of the indicating devices for each caravan. In other words, one caravan can illuminate their indicating devices with a first color and a different caravan can illuminate their indicating devices with a second color.

As well, if a driver of a host vehicle with a CACC system decides he does not want to be part of a caravan, that driver can dis-engage the CACC system in his or her vehicle, thus avoiding becoming part of an existing caravan.

Sixth Embodiment

Figure 21:
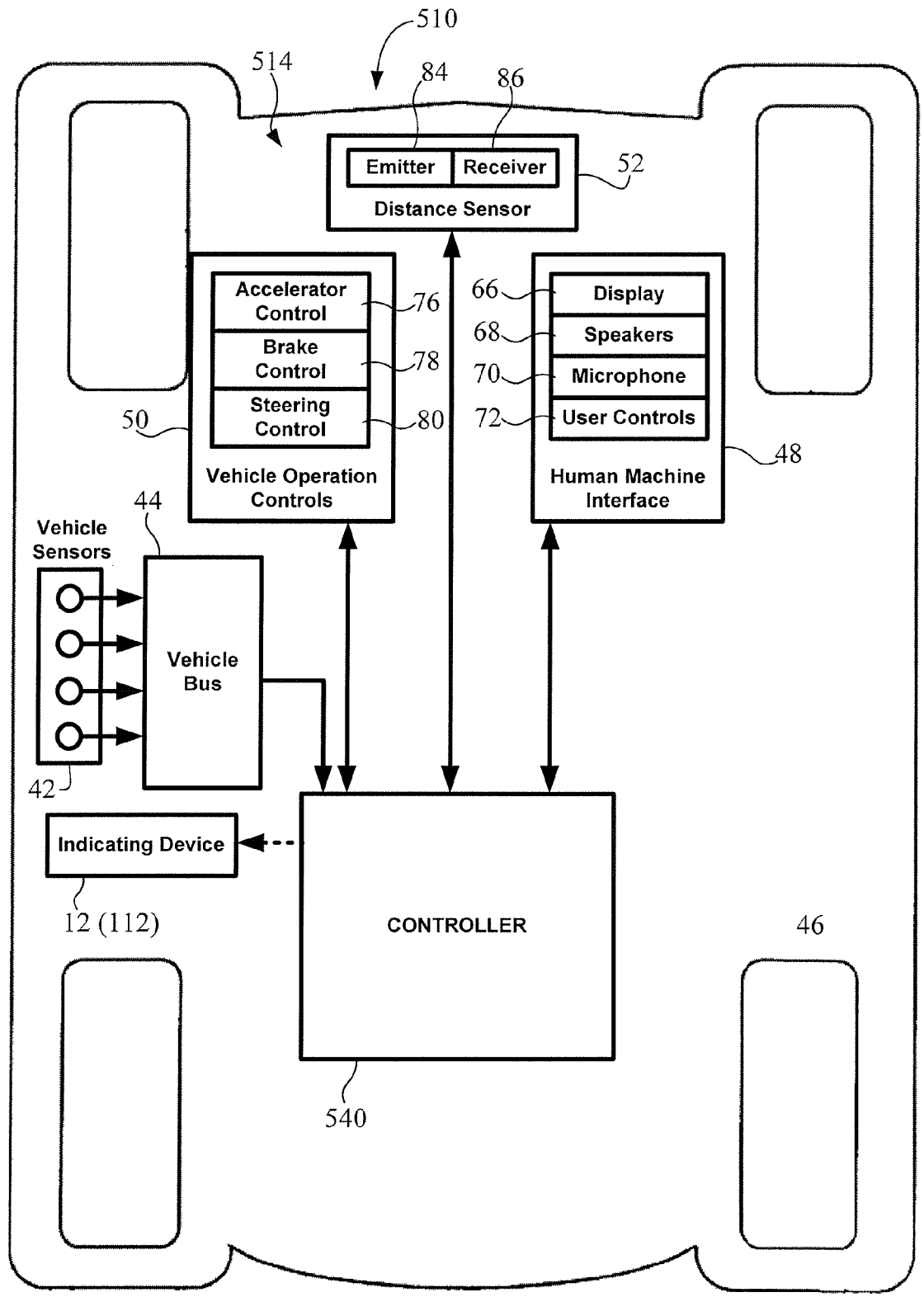
FIG. 21 is a schematic view of the host vehicle showing various features of a cruise control system and connection to the externally perceivable indicating device in accordance with a sixth embodiment.

Referring now to FIG. 21, a host vehicle 510 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

Basically, the host vehicle 510 includes an adaptive cruise control system 514 (an ACC system 514) that includes many of the features of the CACC system 14. For example, the ACC system 514 includes controller 540 that is connected to the various vehicle sensors 42, the vehicle bus 44, the human/machine interface 48, the vehicle operation controls 50 and the distance sensor 52. The various vehicle sensors 42, the vehicle bus 44, the human/machine interface 48, the vehicle operation controls 50 and the distance sensor 52 are all described above and can be essentially the same features as above. Therefore, since the various vehicle sensors 42, the vehicle bus 44, the human/machine interface 48, the vehicle operation controls 50 and the distance sensor 52 are all described above, further description is eliminated for the sake of brevity.

The controller 540 of the host vehicle 510 includes programming and/or hard wired features for controlling the ACC system 514, where the host vehicle 510 can have speed control based upon the speed of a forward vehicle such as the forward vehicles 10' and 110', described above. However, the ACC system 514 does not necessarily include the DSRC 36 or the global positioning system 46 (GPS 46), and therefore does not have vehicle-to-vehicle communications and is not a CACC system per se.

Rather, the ACC system 514 controls the speed of the host vehicle 510 based upon changes in a leading vehicle, where the distance sensor 52 detects changes in relative distance between the host vehicle and the leading vehicle, in a conventional manner such as that described in U.S. Pat. No. 6,985,805, issued Jan. 10, 2006, which is incorporated herein by reference in its entirety.

The host vehicle 510 does include the indicating device 12 (or the indicating device 112 or any of the indicating devices of the third thru fifth embodiments) that can be manually activated by the driver of the host vehicle 510, or can be automatically activated by the ACC system 514 upon determination that the ACC system 514 is operating while monitoring distance between a preceding or leading vehicle and the host vehicle 510, based upon feedback from the distance sensor 52.

Hence, the indicating device 12 can be operated in an unlinked mode where the indicating device 12 is not operated and a linked mode where the indicating device 12 is operated to illuminate, indicating that the ACC system 514 is activated and following a forward vehicle, maintaining a predetermined distance therefrom and adjusting the speed of the host vehicle 510 to maintain that predetermined distance.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the indicating device. Accordingly, these terms, as utilized to describe the present invention should be interpreted relative to a vehicle equipped with the indicating device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A host vehicle comprising:
   a cruise control system configured to selectively synchronize speed control of the host vehicle with at least one other vehicle, the cruise control system including:
   a relative position detecting device configured to determine position of the at least one other vehicle relative to the host vehicle, and
   a vehicle speed control device; and
   an externally perceivable indicating device configured to provide an indication of the following operating modes of the cruise control system of the host vehicle: a stand-by mode in which the externally perceivable indicating device is operated to indicate a desire to group the host vehicle with the at least one other vehicle, and a linked mode in which the externally perceivable indicating device is operated to indicate the host vehicle is grouped with the at least one other vehicle to travel together at a synchronized speed.

2. The host vehicle according to claim 1, wherein the externally perceivable indicating device is further configured to indicate an unlinked mode in which the externally perceivable indicating device is not operated.

3. The host vehicle according to claim 2, wherein the externally perceivable indicating device is configured to indicate a desired position of the host vehicle relative to the at least one other vehicle while the cruise control system is operating in the stand-by mode when the host vehicle and the at least one other vehicle are unaligned, and the externally perceivable indicating device is configured to indicate an actual position of the host vehicle relative to the at least one other vehicle when the host vehicle and the at least one other vehicle are aligned with the cruise control system operating in the linked mode.

4. The host vehicle according to claim 1, wherein
the externally perceivable indicating device is configured to indicate the following operating modes of the cruise control system of the host vehicle in the linked mode: a frontward vehicle linked mode in which the externally perceivable indicating device is operated to indicate the position of the host vehicle is forward of the at least one other vehicle, a following vehicle linked mode in which the externally perceivable indicating device is operated to indicate the position of the host vehicle is rearward a first vehicle of the at least one other vehicle and is forward of a second vehicle of the at least one other vehicle, and a rearward vehicle linked mode in which the externally perceivable indicating device is operated to indicate the position of the host vehicle is rearward of the at least one other vehicle.

5. The host vehicle according to claim 1, wherein the externally perceivable indicating device includes a front indicating portion and a rear indicating portion, such that
    with the cruise control system in an unlinked mode the front indicating portion and the rear indicating portion of the externally perceivable indicating device are not operated,
    with the cruise control system in the stand-by mode one or both of the front indicating portion and the rear indicating portion is operated to indicate a desired position of the host vehicle relative to the at least one other vehicle,
    with the cruise control system in a frontward vehicle linked mode only the rear indicating portion of the externally perceivable indicating device is operated,
    with the cruise control system in a following vehicle linked mode both the front and rear indicating portions of the externally perceivable indicating device are operated, and
    with the cruise control system in a rearward vehicle linked mode only the front indicating portion of the externally perceivable indicating device is operated.

6. The host vehicle according to claim 1, wherein
the externally perceivable indicating device includes a front indicating portion and a rear indicating portion, the front indicating portion being separated and spaced apart from the rear indicating portion.

7. The host vehicle according to claim 1, wherein
the relative position detecting device of the cruise control system comprises an emitter and a receiver for receiving reflected emissions such that in response to receiving prescribed reflected emissions reflected from the at least one other vehicle, the cruise control system of the host vehicle adjusts speed of the host vehicle to maintain a predetermined distance from the at least one other vehicle thereby synchronizing speed control.

8. The host vehicle according to claim 1, wherein
the host vehicle further comprises a vehicle-to-vehicle communication device configured to transmit outgoing messages containing location and trajectory information of the host vehicle and receive incoming messages containing location and trajectory information of the at least one other vehicle.

9. The host vehicle according to claim 8, wherein
the relative position detecting device of the cruise control system comprises a satellite communication device configured to detect the location and trajectory information of the host vehicle and provide the location and trajectory information to the vehicle-to-vehicle communication device.

10. The host vehicle according to claim 8, wherein the stand-by mode is indicated by the externally perceivable indicating device in response to the host vehicle being located within a predetermined distance from the at least one other vehicle.

11. The host vehicle according to claim 8, wherein
the cruise control system is configured such that in response to vehicle-to-vehicle communications with the at least one other vehicle to synchronize speed control, the externally perceivable indicating device provides a visual indication of the operating mode of the host vehicle in concert with a second visual indication from a second externally perceivable indicating device of the at least one other vehicle.

12. The host vehicle according to claim 11, wherein
the cruise control system further includes an internally perceivable indicator configured such that in response to vehicle-to-vehicle communications with the at least one other vehicle, the internally perceivable indicating device provides indications in concert with the second visual indication of the second externally perceivable indicating device of the at least one other vehicle.

13. A method of operating a host vehicle to form a caravan of vehicles, comprising:
detecting at least one other vehicle located within a first prescribed distance from the host vehicle, the host vehicle having a cruise control system, an interface and an externally perceivable indicating device;
operating the externally perceivable indicating device to indicate the cruise control system is operating in a stand-by mode when the at least one other vehicle is within the first prescribed distance from the host vehicle;
aligning the host vehicle with the at least one other vehicle such that one of the host vehicle and the at least one other vehicle is a frontward vehicle and the other of the host vehicle and the at least one other vehicle is a following vehicle of the caravan of vehicles;
presenting an option via the interface of the host vehicle to synchronize the cruise control system of the host vehicle with the at least one other vehicle; and
synchronizing the cruise control system of the host vehicle with the at least one other vehicle to maintain a second prescribed distance therebetween in response to receiving an input via the interface to synchronize the cruise control system of the host vehicle with the at least one other vehicle; and
operating the externally perceivable indicating device to indicate the cruise control system is operating in a linked mode with the host vehicle being aligned with the at least one other vehicle and the cruise control system of the host vehicle is synchronized with the at least one other vehicle.

14. The method of forming a caravan of vehicles according to claim 13, wherein
the operating of the externally perceivable indicating device to indicate the cruise control system is operating in the stand-by mode includes displaying an indication of a desired position of the host vehicle relative to the at least one other vehicle, the desired position including a frontward position or a rearward position relative to the at least one other vehicle in the caravan, the stand-by mode being indicated before at least one of the aligning of the host vehicle with the at least one other vehicle and the synchronizing of the cruise control system of the host vehicle with the at least one other vehicle.

15. The method of forming a caravan of vehicles according to claim 13, wherein
the operating of the externally perceivable indicating device to indicate the cruise control system of the host vehicle is operating in the linked mode includes displaying an indication of a relative position of the host vehicle relative to the at least one other vehicle, the relative position including a frontward position or a rearward position of the host vehicle relative to the at least one other vehicle in the caravan.

16. The method of forming a caravan of vehicles according to claim 13, wherein
the externally perceivable indicating device includes a front indicating portion and a rear indicating portion, such that
with the cruise control system operating in an unlinked mode the front indicating portion and the rear indicating portion of the externally perceivable indicating device are not operated,
with the cruise control system operating in the stand-by mode one or both of the front indicating portion and the rear indicating portion is operated to indicate a desired position of the host vehicle relative to the at least one other vehicle,
with the cruise control system operating in a frontward vehicle linked mode only the rear indicating portion of the externally perceivable indicating device is operated,
with the cruise control system operating in a following vehicle linked mode both the front and rear indicating portions of the externally perceivable indicating device are operated, and
with the cruise control system operating in a rearward vehicle linked mode only the front indicating portion of the externally perceivable indicating device is operated.

17. A host vehicle comprising:
a cruise control system configured to selectively synchronize speed control of the host vehicle with at least one other vehicle, the cruise control system including:
a relative position detecting device configured to determine position of the at least one other vehicle relative to the host vehicle, and
a vehicle speed control device; and
an externally perceivable indicating device configured to provide an indication of an operating mode of the cruise control system, the operating mode being indicated by the externally perceivable indicating device including an indication of a position of the host vehicle relative to the at least one other vehicle;
wherein the externally perceivable indicating device includes a front indicating portion and a rear indicating portion; and
wherein the externally perceivable indicating device is configured to indicate the following operating modes of the cruise control system of the host vehicle:
an unlinked mode in which the front indicating portion and the rear indicating portion are not operated,
a stand-by mode in which one or both of the front indicating portion and the rear indicating portion is operated to indicate a desired position of the host vehicle relative to the at least one other vehicle, a frontward vehicle linked mode in which only the rear indicating portion of the externally perceivable indicating device is operated, a following vehicle linked mode in which both the front and rear indicating portions of the externally perceivable indicating device are operated, and a rearward vehicle linked mode in which only the front indicating portion of the externally perceivable indicating device is operated.

18. The host vehicle according to claim 17, wherein the externally perceivable indicating device is operated to indicate that the cruise control system is operating in the stand-by mode in response to the host vehicle being located within a predetermined distance from the at least one other vehicle.

19. The host vehicle according to claim 17, wherein the externally perceivable indicating device further indicates that the cruise control system is operating in a linked mode in which the externally perceivable indicating device is operated to indicate the host vehicle is grouped with the at least one other vehicle.

20. The host vehicle according to claim 17, wherein when the externally perceivable indicating device indicates that the cruise control system is operating in the stand-by mode, the externally perceivable indicating device indicates a desire to group the host vehicle with the at least one other vehicle when the at least one other vehicle is within a predetermined distance from the host vehicle.

* * * * *